(12) United States Patent
Lee et al.

(10) Patent No.: US 11,250,870 B2
(45) Date of Patent: Feb. 15, 2022

(54) ELECTRONIC DEVICE FOR SUPPORTING AUDIO ENHANCEMENT AND METHOD FOR THE SAME

(71) Applicant: Samsung Electronics Co., Ltd., Gyeonggi-do (KR)

(72) Inventors: Gunwoo Lee, Gyeonggi-do (KR); Hangil Moon, Gyeonggi-do (KR); Soonho Baek, Gyeonggi-do (KR); Beakkwon Son, Gyeonggi-do (KR); Jaemo Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/704,243

(22) Filed: Dec. 5, 2019

(65) Prior Publication Data

US 2020/0194025 A1 Jun. 18, 2020

(30) Foreign Application Priority Data

Dec. 12, 2018 (KR) .......................... 10-2018-0160109

(51) Int. Cl.
*G10L 21/0264* (2013.01)
*G10L 25/84* (2013.01)
(Continued)

(52) U.S. Cl.
CPC .......... *G10L 21/0264* (2013.01); *G10L 25/84* (2013.01); *H04L 65/601* (2013.01);
(Continued)

(58) Field of Classification Search
CPC ..... G10L 21/0624; G10L 25/84; G10L 15/06; G10L 21/02; G10L 21/0232;
(Continued)

(56) References Cited

U.S. PATENT DOCUMENTS 9,113,240 B2 8/2015 Ramakrishnan et al.
10,013,230 B2 7/2018 Woo
(Continued)

FOREIGN PATENT DOCUMENTS

| EP | 2 101 466 A1 | 9/2009 | |
|---|---|---|---|
| EP | 2074400 B1 * | 6/2010 | ......... G10L 21/0208 |
| EP | 2 277 323 A1 | 1/2011 | |
| JP | 3416469 B2 | 12/1998 | |
| WO | 2018/0164304 A1 | 9/2018 | |

OTHER PUBLICATIONS

International Search Report dated Apr. 4, 2020.

*Primary Examiner* — Matthew A Eason
*Assistant Examiner* — Kuassi A Ganmavo
(74) *Attorney, Agent, or Firm* — Cha & Reiter, LLC

(57) ABSTRACT

In accordance with an aspect of the disclosure, an electronic device comprises a communication circuitry configured to establish a voice call with an external electronic device; a microphone; a memory configured to store a first sound quality enhancement parameter; and a processor, wherein the processor is configured to: obtain an audio signal associated with speech through the microphone, during the voice call; transmit, to a server, voice data based on the audio signal when the ratio is within a first range; transmit, to the server, noise data based on the audio signal, when the ratio is within a second range; receive an updated sound quality enhancement parameter from the server with the communication circuit during the voice call; and adjust the first sound quality enhancement parameter stored in the memory, based on the updated sound quality enhancement parameter received from the server.

14 Claims, 9 Drawing Sheets

(51) Int. Cl.
*H04L 29/06* (2006.01)
*H04R 3/04* (2006.01)
*G10L 21/02* (2013.01)
*G10L 19/24* (2013.01)
*G10L 21/0364* (2013.01)
*G10L 15/06* (2013.01)
*H04M 3/18* (2006.01)
*H04M 3/00* (2006.01)
*G10L 21/0232* (2013.01)
*G10L 25/78* (2013.01)

(52) U.S. Cl.
CPC .............. *H04L 65/80* (2013.01); *H04R 3/04* (2013.01); *G10L 15/06* (2013.01); *G10L 19/24* (2013.01); *G10L 21/02* (2013.01); *G10L 21/0232* (2013.01); *G10L 21/0364* (2013.01); *G10L 25/78* (2013.01); *H04M 3/002* (2013.01); *H04M 3/18* (2013.01)

(58) Field of Classification Search
CPC ............... G10L 21/0364; G10L 25/78; G10L 2021/0216; G10L 19/24; H04L 65/601; H04L 65/80; H04R 3/04; H04M 3/18; H04M 3/002; H04M 3/2236; A63F 13/87
See application file for complete search history.

(56) References Cited

U.S. PATENT DOCUMENTS

| | | |
|---|---|---|
| 10,362,397 B2 | 7/2019 | Lin et al. |
| 2008/0086301 A1* | 4/2008 | Tachibana ........... G10L 21/0208 704/201 |
| 2008/0261586 A1* | 10/2008 | Joensuu .............. H04M 3/2236 455/424 |
| 2011/0060592 A1 | 3/2011 | Kang et al. |
| 2012/0215536 A1* | 8/2012 | Sehlstedt ................ G10L 25/18 704/246 |
| 2015/0030163 A1* | 1/2015 | Sokolov .................. G10L 25/69 381/56 |
| 2015/0379982 A1* | 12/2015 | Paquier ................... G10L 15/26 704/260 |
| 2016/0170706 A1 | 6/2016 | Woo |
| 2016/0240211 A1 | 8/2016 | Lin et al. |
| 2017/0331837 A1* | 11/2017 | Moon ..................... H04L 29/08 |
| 2018/0069958 A1* | 3/2018 | Kang ...................... H04M 3/18 |
| 2019/0080708 A1* | 3/2019 | Mohan .................... G10L 25/60 |
| 2019/0082276 A1* | 3/2019 | Crow ..................... H04R 25/554 |
| 2019/0164563 A1* | 5/2019 | Volcker ................ H04L 12/1827 |
| 2020/0028955 A1* | 1/2020 | Aihara ................ H04M 1/6066 |
| 2020/0075038 A1* | 3/2020 | Sung ........................ H04B 1/40 |

* cited by examiner

ELECTRONIC DEVICE FOR SUPPORTING AUDIO ENHANCEMENT AND METHOD FOR THE SAME

CROSS-REFERENCE TO RELATED APPLICATION(S)

This application is based on and claims priority under 35 U.S.C. § 119 to Korean Patent Application No. 10-2018-0160109, filed on Dec. 12, 2018, in the Korean Intellectual Property Office, the disclosure of which is incorporated by reference herein its entirety.

BACKGROUND

1. Field

The disclosure relates to an electronic device, capable of supporting various audio enhancements, and a method for the same.

2. Description of Related Art

During a voice call, an electronic device receives an audio signal from the user through the microphone and from another electronic device. The audio signal from the microphone represents the speech from the user. The audio signal from the other electronic device is output via a speaker. Ideally, the output from the speaker replicates the speech received at the other electronic device. However, noise from various sources can alter the audio signal, thereby causing the output from the speaker to have reduced quality.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprises a communication circuitry configured to establish a voice call with an external electronic device; a microphone; a memory configured to store a first sound quality enhancement parameter; and a processor operatively connected with the communication circuitry, the microphone, and the memory, wherein the processor is configured to: obtain an audio signal associated with speech through the microphone, during the voice call; transmit, to a server, voice data based on the audio signal when the ratio is within a first range; transmit, to the server, noise data based on the audio signal, when the ratio is within a second range different from the first range; receive an updated sound quality enhancement parameter from the server with the communication circuit during the voice call; and adjust the first sound quality enhancement parameter stored in the memory, based at least on the updated sound quality enhancement parameter received from the server during the voice call.

In accordance with another aspect, an electronic device comprises: a communication circuit; a speaker; a microphone; a memory storing a first sound quality enhancement parameter associated with the electronic device or a user of the electronic device; and a processor operatively connected with the communication circuit, the speaker, the microphone, and the memory, wherein the processor is configured to: determine whether a first audio signal obtained using the microphone includes a voice signal, determine whether a signal-to-noise ratio (SNR) for the voice signal of the first audio signal is equal to or greater than a specific value, transmit, to a first external electronic device, voice data based on the first audio signal, when the SNR is equal to or greater than the specific value, update the first sound quality enhancement parameter using the first data, and perform sound quality enhancement of an audio signal obtained through the microphone using the updated first sound quality enhancement parameter.

In accordance with another aspect of the disclosure, a method for sound quality enhancement of an electronic device, the method comprising: obtaining an audio signal, determining whether the obtained audio signal includes a voice signal, determining whether an SNR for the voice signal of the audio signal is equal to or greater than a specific value, when the audio signal includes the voice signal, transmitting, to an external electronic device, voice data based on the audio signal, when the SNR is equal to or greater than the specific value, receiving first data generated based on the voice data from the external electronic device, in response to transmission of the voice data, updating a first sound quality enhancement parameter associated with the electronic device using the first data, and performing sound quality enhancement for the received audio signal through a microphone of the electronic device by using the updated first sound quality enhancement parameter. Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, same or similar components will be assigned with same or similar reference numerals.

DETAILED DESCRIPTION

An electronic device may transmit and receive audio signals (electronic analog signals with frequencies within the audible human range) depending on various applications. For example, the electronic device may transmit/receive an audio signal with an external electronic device to perform a voice call. The electronic device may receive an audio signal representing a voice from a user, and may convert the received audio signal into a digital signal representing the audio signal. The electronic device may attempt to enhance the sound quality of the audio signal through various digital signal processes on the obtained audio signal.

For example, the electronic device may be configured to use only a target audio signal component from the obtained audio signal. In the case of a voice call, the electronic device may perform the sound quality enhancement for the obtained audio signal to remove a noise component other than an audio signal component corresponding to a user voice. For example, the electronic device may generate an audio signal including only an audio signal of a frequency band corresponding to the voice of a human being through band pass filtering for an audio signal component other than a specific frequency band.

Conventional methods for enhancing the sound quality fail to reflect the voice of the user or the present use environment therein to remove noise. For example, when a sound quality is merely improved based on spectrum analysis, the noise corresponding to the voice band of a human being fails to remove noise corresponding to the voice band of the user, so voice loss may be occur. A method for sound quality enhancement using machine learning using a stored voice model would use a large amount of data and computational bandwidth for the voice model. Moreover, the voice model may not be trained based on the voice of the user, so the voice model is actually not optimized or personalized for the voice of the user.

Accordingly, it may be difficult for the electronic device to update a previously stored voice model using the user voice.

Certain embodiments in the disclosure may be described with reference to the accompanying drawings. Accordingly, those of ordinary skill in the art should understand that embodiments and the terminology used in the embodiments are not limited to specific embodiments, but various modifications, equivalents, and/or alternatives of the embodiments can be made without departing from the technical spirit of the disclosure.

Figure 1:
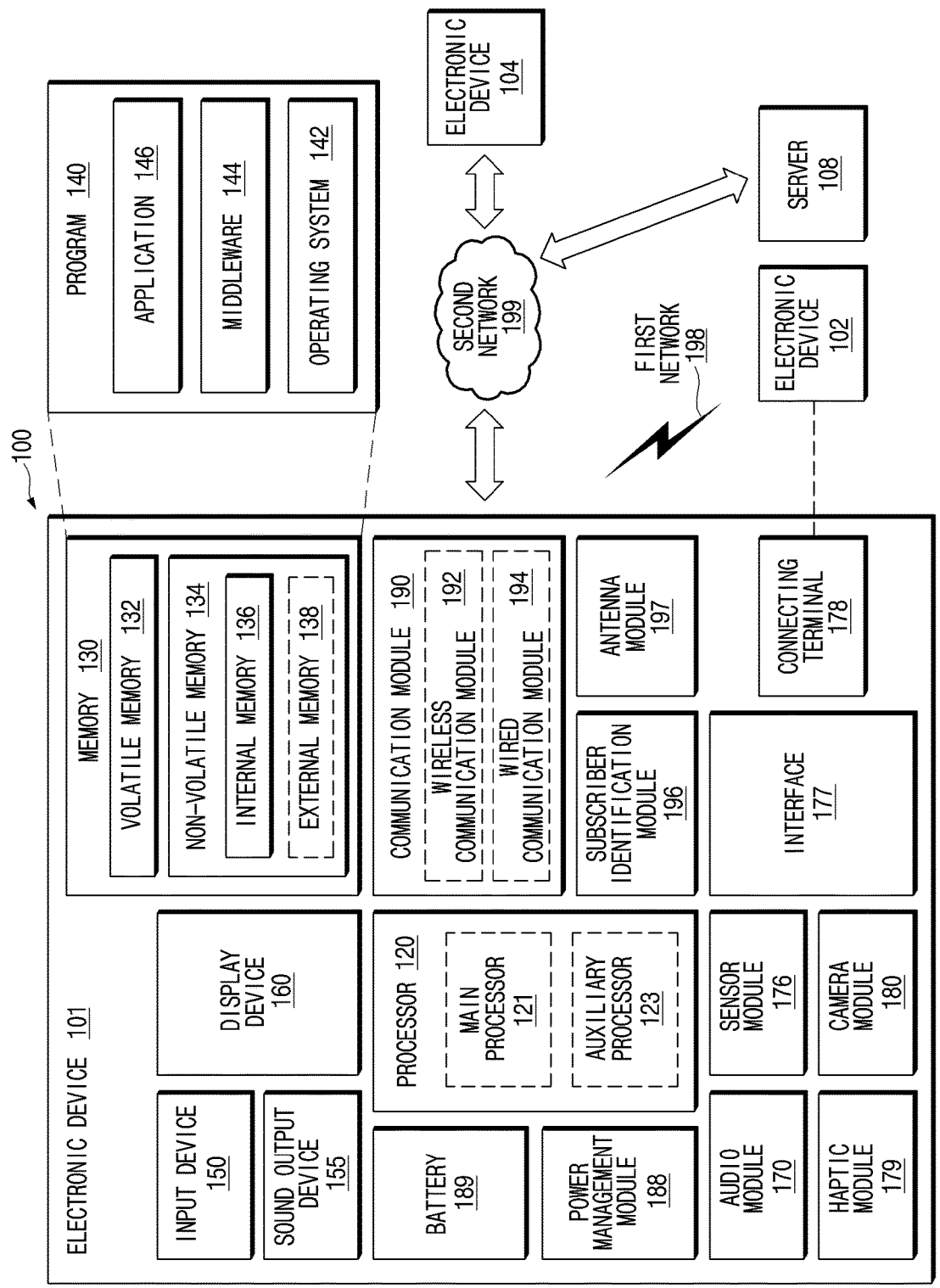
FIG. 1 illustrates a block diagram of an electronic device in a network, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or a luminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or a luminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above. It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$", and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration.

According to certain embodiments, operations performed by the module, the program, or another component may be carried out sequentially, in parallel, repeatedly, or heuristically, or one or more of the operations may be executed in a different order or omitted, or one or more other operations may be added.

Aspects of the disclosure may provide at least the advantages described above. An aspect of the disclosure is to provide a method for enhancing an audio signal, which is more exact and personalized for the voice of the user. In addition, according to certain embodiments of the disclosure, the method for enhancing the audio signal may be received in a receiving stage.

Figure 2:
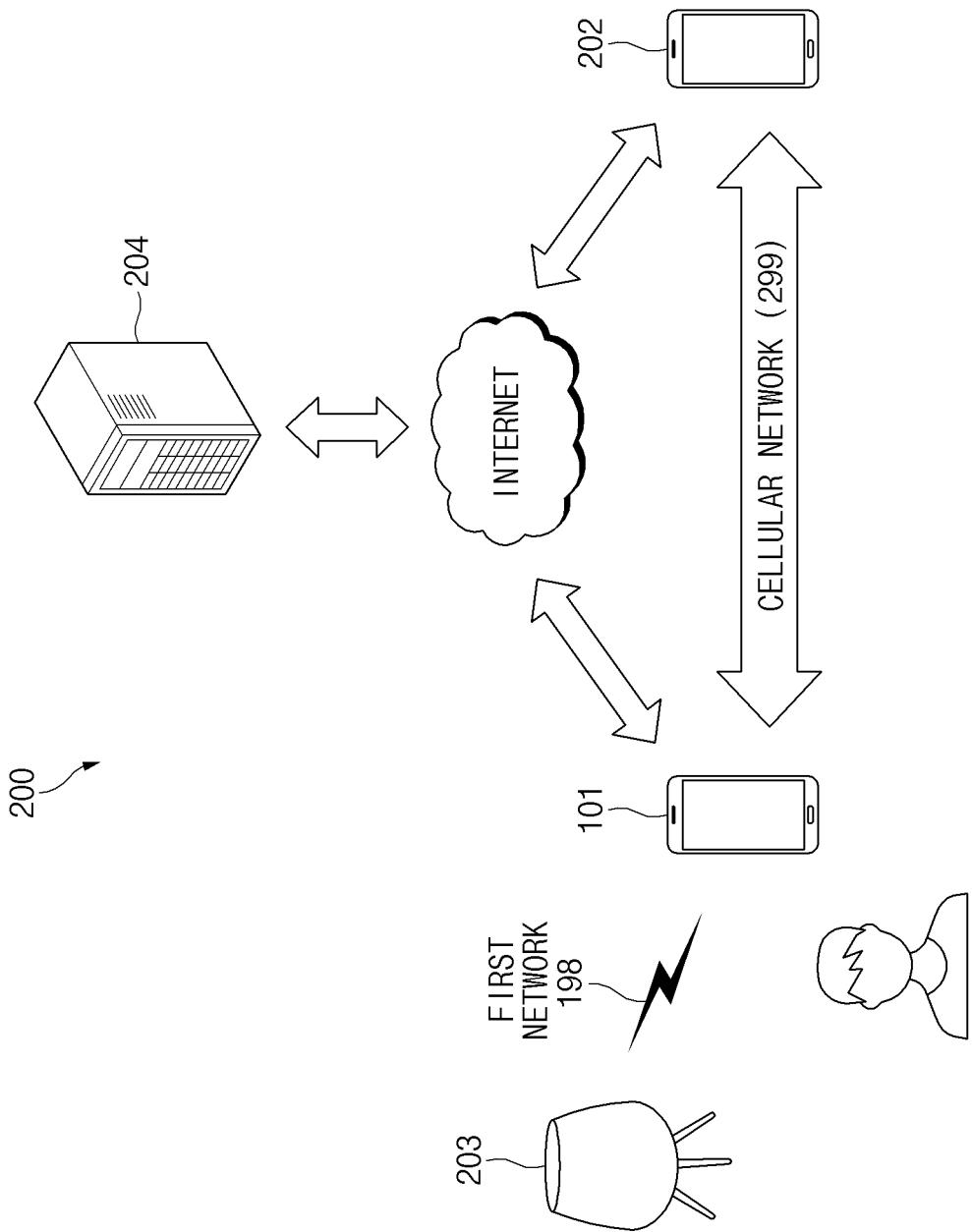
FIG. 2 illustrates a sound quality enhancement environment, according to certain embodiments.

FIG. 2 illustrates a sound quality enhancement environment 200, according to certain embodiments.

Referring to FIG. 2, according to certain embodiments, the electronic device 101 may be a mobile phone. According to an embodiment, the electronic device 101 may make communication with other an external electronic device by using a communication circuitry (e.g., a communication module 190 of FIG. 1). For example, the electronic device 101 may make communication with an external electronic device 202 (e.g., the electronic device 104, such as a mobile phone, of FIG. 1) through the cellular network 299 (e.g., the second network 199 of FIG. 1) by using the communication circuitry. For another example, the electronic device 101 may make communication with a second external electronic device 203 (e.g., the electronic device 102, such as artificial intelligence (AI) speaker of FIG. 1) through the first network 198. As another example, the electronic device 101 may make communication with the server 204 (e.g., the server 108 of FIG. 1) through the Internet (e.g., the second network 199 of FIG. 1).

According to certain embodiments, the electronic device 101 engage in a voice call with the first external electronic device 202 by transmitting or receiving voice data through the cellular network 299. For example, the voice call may be a received call (i.e., a mobile originated call) or a transmitted call (i.e., a mobile terminated call).

During a voice call between the electronic device 101 and the first external device 202, a microphone at the electronic device 101 converts speech received from the user to an audio signal and transmits the audio signal to the first external electronic device 202. Additionally, a microphone at first external electronic device 202 converts speech to an audio signal and transmits the audio signal to the electronic device 101. The electronic device 101 receives the audio signal from the first external electronic device 202. A speaker at the electronic device 101 converts the audio signal from the first external electronic device 202 to sound that, ideally, replicates the speech received at the first external electronic device 202. Similarly, a speaker at the first external electronic device 202 converts the audio signal from the external electronic device 101 to sound that, ideally, replicates the speech received at the electronic device 101. Accordingly, during a voice call, the electronic device 101 receives an audio signal from the microphone at the electronic device 101, and from first external electronic device 202.

It shall be understood that when transmitting the audio signal, the transmitting device (for example, electronic device 101) may convert the audio signal to a digital signal, transmit the digital signal using a radio frequency over a network, such as cellular network 299 to a receiving device 202. It shall be understood that when receiving the audio signal, the receiving device (for example, first external electronic device 202) may receive a radio frequency signal from a network, such as cellular network 299, extract a digital signal, and convert the digital signal to an audio signal.

According to an embodiment, the electronic device 101 may obtain an audio signal associated with the voice call. For example, the electronic device 101 may obtain the audio signal using a microphone (e.g., the input device 150 of FIG. 1) of the electronic device 101. For example, the electronic device 101 may receive the audio signal from the first external electronic device 202. For another example, the electronic device 101 may receive the audio signal from the first external electronic device 202. According to an embodiment, the electronic device 101 may obtain an audio signal associated with the transmission of a call and may obtain an audio signal associated with the reception of the call. For example, when the audio signal associated with the transmission of the call is received, the electronic device 101 may process the audio signal and may transmit the audio signal to the first external electronic device 202. For another example, when the electronic device 101 obtains the audio signal associated with the reception, the electronic device 101 may process the audio signal and may output the audio signal through the speaker (e.g., the sound output device 155 of FIG. 1 and/or the audio module 170) of the electronic device 101 or an external output device (e.g., the second external electronic device 203 or the earphone (not illustrated)) connected with the electronic device 101.

According to certain embodiments, the electronic device 101 may perform sound quality enhancement for a received audio signal (from first external electronic device 202) using noise suppression on the audio signal based on machine learning. The electronic device 101 may perform sound quality enhancement for the audio signal associated with the reception of the call. For example, the electronic device 101 may perform sound quality enhancement for the audio signal received from the first external electronic device 202. The electronic device 101 may perform a sound quality enhancement for the received audio signal and then output an audio signal having the enhanced sound quality via the speaker. The sound quality enhancement may include noise suppression for an audio signal received based on machine learning. For example, the electronic device 101 may obtain, from the server 204, a sound quality enhancement model (e.g., a sound quality enhancement parameter) associated with the first external electronic device 202 and may perform noise suppression for the audio signal received using the sound quality enhancement model. According to an embodiment, the electronic device 101 may perform speech enhancement for an audio signal received based on machine learning and/or speech regression. For example, the electronic device 101 may receive the sound quality enhancement model associated with the first external electronic device 202 from the server 204, and may perform speech enhancement and/or speech regression for the audio signal received using the sound quality enhancement model.

According to certain embodiments, the electronic device 101 may perform echo cancellation for the audio signal from the microphone using machine learning. The electronic device 101 may perform the sound quality enhancement for the audio signal associated with the transmission of the call. For example, the electronic device 101 may perform the sound quality enhancement for the audio signal obtained from the microphone and may transmit the audio signal having the enhanced sound quality to the first external electronic device 202. According to an embodiment, the electronic device 101 may perform echo cancellation for the audio signal through machine learning based on the sound quality enhancement model (e.g., the sound-quality improved parameter) for the obtained audio signal. According to an embodiment, the electronic device 101 may perform echo cancellation for the audio signal through machine learning based on the sound quality enhancement model (e.g., the sound-quality improved parameter) for the obtained audio signal.

According to an embodiment, the electronic device 101 may perform sound quality enhancement for an audio signal using at least one sound quality enhancement parameter stored in a memory (e.g., the memory 130 of FIG. 1) of the electronic device 101. For example, the electronic device 101 may perform the sound quality enhancement for the audio signal using a sound quality enhancement model (e.g., a parameter associated with the sound quality enhancement). In the case of the sound quality enhancement associated with the transmission of the speech, the sound quality enhancement model may be generated a voice model personalized for a user of the electronic device 101. For example, the electronic device 101 may enhance a voice of the user, which is included in the audio signal, to be a distinctive voice by using the sound quality enhancement model. For another example, the electronic device 101 may remove a noise from the audio signal by using the sound quality enhancement model.

According to an embodiment, the electronic device 101 may perform sound quality enhancement based on voice activity detection (VAD). For example, the electronic device 101 may perform the sound quality enhancement using the sound quality enhancement model, when detecting the user voice using the VOD. For another example, the electronic device 101 may be configured to transmit noise data based on the audio signal to the server 204, when the user voice is not detected using the VAD.

According to certain embodiments, the electronic device 101 may update the sound quality enhancement model. According to an embodiment, the electronic device 101 may update the sound quality enhancement model stored in the electronic device 101 using the data received from the server 204. For example, the electronic device 101 may update the sound quality enhancement model, which is stored in the electronic device 101 by the manufacturer of the electronic device 101, using the data received from the server 204. For example, the electronic device 101 may update the sound quality enhancement model by at least partially updating (e.g., overwriting) the sound quality enhancement model stored in the memory by using the updated sound quality enhancement model included in the data received from the server 204. For another example, the electronic device 101 may receive, from another electronic device (e.g., the second external electronic device 203), a sound quality enhancement model associated with the electronic device 101 or the user of the electronic device 101

According to an embodiment, the electronic device 101 may receive, from the server 204 or another electronic device (e.g., the second external electronic device 203), a sound quality enhancement model associated with the electronic device 101 or the user of the electronic device 101. For example, the electronic device 101 may transmit, to the external server 204 or another external electronic device, a request signal including an identifier (e.g., an ID or a phone number) of the electronic device 101 and/or an identifier (e.g., an ID, an e-mail address, or a name) of the user of the electronic device 101. The electronic device 101 may receive, from the server 204 or another electronic device, data (e.g., the updated sound quality enhancement model) for updating the sound quality enhancement model associated with the electronic device 101 or the user of the electronic device 101. For example, the electronic device 101 may update the sound quality enhancement model by storing, in the model, or using the data received from the server 204 or the another external electronic device 101.

According to an embodiment, the electronic device 101 may receive, from the server 204, the sound quality enhancement model updated based on noise data. For example, the electronic device 101 may transmit noise data based on an audio signal including a noise signal to the server 204, and may receive, from the server 204, data (e.g., the updated sound quality enhancement model) updated based on the noise data.

According to certain embodiments, the electronic device 101 may transmit at least a portion of an audio signal to the server 204 to update the sound quality enhancement model. For example, the electronic device 101 may transmit data (e.g., the voice data and/or noise data) based on the audio signal to the server 204, so as to update the sound quality enhancement model. Voice data can be the digitized voice signal portion of the audio signal. Noise data can be deemed a digitization of the recognized noise signal portion of the audio signal. According to an embodiment, the electronic device 101 may transmit the audio signal to the server 204, based on a speech-to noise ratio (SNR). For example, the electronic device 101 may determine the proportion (e.g., SNR) of a voice signal, when the voice signal is detected from the audio signal. For example, when the proportion is equal to or greater than a specific value, the electronic device 101 may transmit, to the server 204, at least a portion of the audio signal as voice data. According to an embodiment, the electronic device 101 may determine the proportion (e.g., SNR) of the voice signal using the stored sound quality enhancement model. According to an embodiment, the electronic device 101 may transmit, to the server 204, information for identifying the electronic device 101 or the user of the electronic device 101 together with voice data. For example, a speech to text operation can be performed on the audio signal to determine the words that the user has spoken. The stored sound quality enhancement model can then use the text to simulate how the user would say the words of the text. This can be used as the voice data in certain embodiments. A comparison of the signals can be used to determine the noise portion of the audio signal.

According to certain embodiments, the electronic device 101 may transmit noise data to the server 204 to update the sound quality enhancement model. According to an embodiment, the electronic device 101 may transmit, to the server 204, noise data included in an audio signal based on the VAD. For example, the electronic device 101 may transmit, to the server 204, at least a portion of an audio signal, which serves as noise data, when the voice signal is not detected from the obtained audio signal.

According to an embodiment, the noise data or the voiced data may include at least a portion of the audio signal. According to an embodiment, the electronic device 101 may generate the noise data or the voice data by performing a post-processing for the obtained audio signal. For example, the noise data or the voice data may be data (e.g., a feature point) generated based on the audio signal.

According to certain embodiments, the electronic device 101 may transmit voice data and/or noise data under a specific condition. According to an embodiment, the electronic device 101 may transmit voice data and/or noise data to the server 204 when the electronic device 101 is connected with a specific network. According to an embodiment, the electronic device 101 may transmit voice data and/or noise data to the server 204 when the electronic device 101 is connected with a WiFi network. According to an embodiment, the electronic device 101 may transmit voice data and/or noise data to the server 204 based on a specific operation. For example, the electronic device 101 may transmit voice data and/or noise data, when receiving the request from the server 204, when receiving a transmit input from the user, or while performing a voice call.

According to certain embodiments, the server 204 may update the sound quality enhancement model associated with the electronic device 101 using the voice data and/or the noise data received from the electronic device 101. According to an embodiment, the server 204 may update the sound quality enhancement model associated with the electronic device 101 by training the sound quality enhancement model using the received voice data and/or noise data. For example, the server 204 may update the sound quality enhancement model by mixing the received voice data with an arbitrary noise signal and training the mixed signal. According to an embodiment, the server 204 may obtain features, which correspond to the voice data received from the electronic device 101, through machining learning such as the DNN and may generate and/or update the sound quality enhancement model based on the features. According to an embodiment, the server 204 may transmit, to the electronic device 101, the updated sound quality enhancement model or data including information for updating the sound quality enhancement model.

According to an embodiment, the server 204 may include a database including a plurality of sound quality enhancement models. For example, the plurality of sound quality enhancement models may be associated with mutually different electronic devices or mutually different users. The server 204 may store and manage the sound quality enhancement model personalized for the electronic devices or users, respectively.

According to certain embodiments, the server 204 may generate a noise model using noise data received from the electronic device 101. According to an embodiment, the server 204 may generate the noise model by training the received noise data.

According to an embodiment, the server 204 may include a database including a plurality of noise models. According to an embodiment, the server 204 may store or classify the plurality of noise models based on a place where noise is obtained. For example, the serve 204 may classify the noise data, which is received from the electronic device 101, based on the position of the electronic device 101. For example, the server 204 may store the noise model based on the noise data received from the electronic device 101 as a noise model associated with a base station connected with the electronic device 101. According to an embodiment, the server 204 may obtain a noise signal from the base station, and may store the noise model generated based on the obtained noise signal, as the noise model associated with the base station.

According to certain embodiments, the server 204 may update the sound quality enhancement model associated with the electronic device 101 based at least on the voice data, the noise data and/or the noise model received from the electronic device 101. For example, the server 204 may update the sound quality enhancement model associated with the electronic device 101 using the voice data received from the electronic device 101 and the noise model associated with the location of the electronic device 101.

Figure 3:
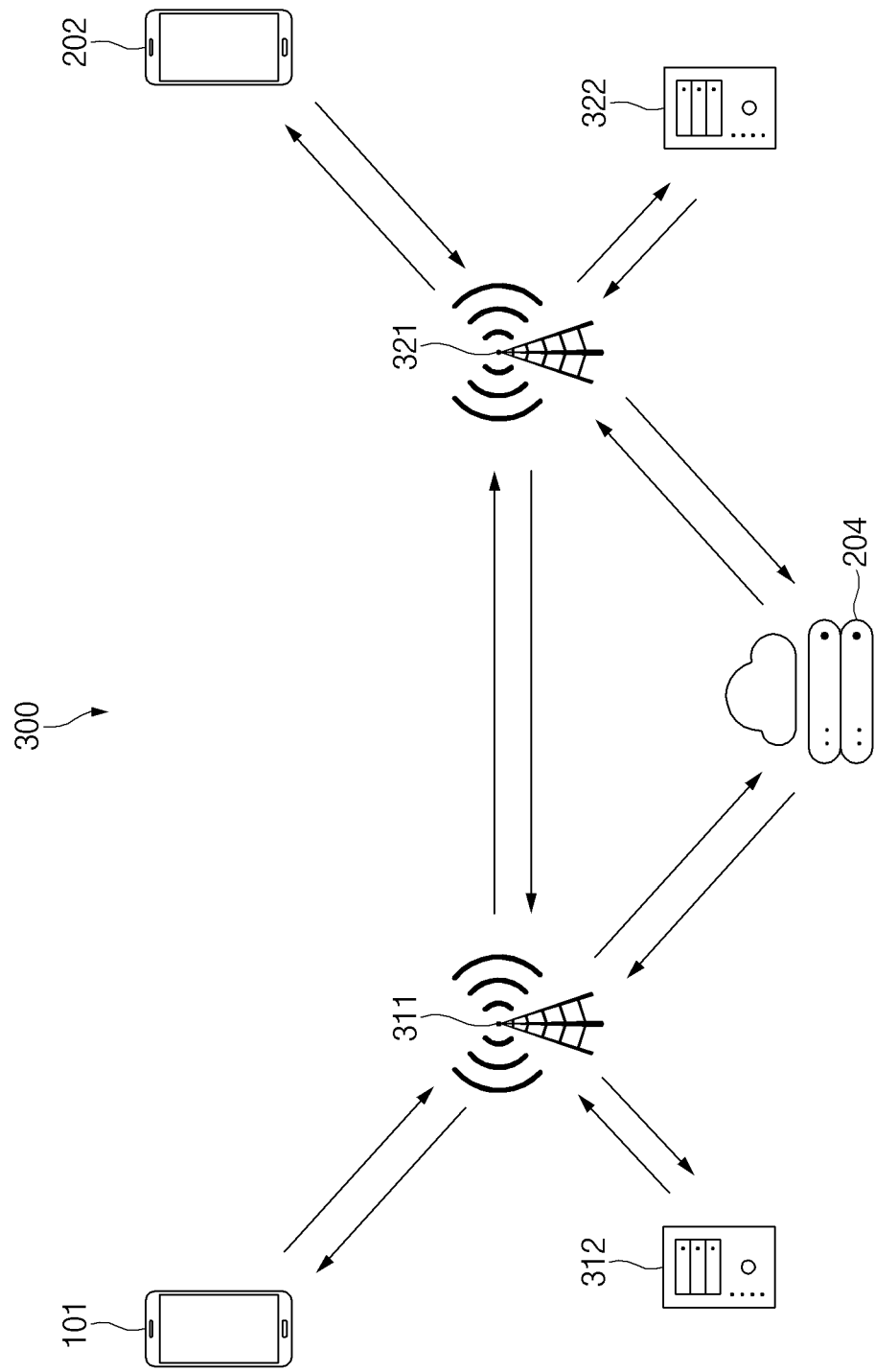
FIG. 3 illustrates a sound enhancement system under a communication environment, according to certain embodiments.

FIG. 3 illustrates the sound enhancement system 300 under the communication environment, according to certain embodiments.

Referring to FIG. 3, according to certain embodiments, the sound enhancement system 300 may perform the sound quality enhancement based on edge computing in fifth generation mobile communication. The edge computing may refer to a technology of providing data to an electronic device 101 through a separate server (e.g., the first edge server 312) installed inside a base station (e.g., the first base station 311) geographically positioned to be proximate or nearest (now collectively referred to as proximate) to the electronic device 101 or installed around the base station. For example, the electronic device 101 may transmit or receive data with a lower latency through a data transmission/reception technology based on edge computing.

According to certain embodiments, the first base station 311 connected with the electronic device 101 may make communication with a first edge server 312 positioned in the first base station 311 or a first edge server 312 positioned to be proximate to the first base station 311. The second base station 321 connected with the first external electronic device 202 may make communication with a second edge server 322 positioned in the second base station 321 or a second edge server 322 positioned to be proximate to the second base station 321. According to an embodiment, the electronic device 101 may transmit/receive data based on edge computing through the first edge server 312. According to an embodiment, the electronic device 202 may transmit/receive data based one edge computing through the second edge server 322. For example, the electronic device 101 uses the first edge server 312 and the first external electronic device 202 uses the second edge server 322, thereby transmitting and receiving at a more improved data rate.

According to certain embodiments, the first edge server 312 may store information on a noise model related to a place proximate or within a particular distance (such as 10 m, or 100 m, depending on embodiment) to the first edge server 312. For example, the noise model stored in the first edge server 312 may be generated by the server 204 based on a noise signal obtained at a place geographically proximate or within a particular distance to the first edge server 312. According to an embodiment, the noise model stored in the first edge server 312 may be generated based on the noise signal obtained by electronic devices connected with the first base state 311. For example, the server 204 may generate the noise model based on the noise signal obtained by the electronic devices connected with the first base station 311

According to an embodiment, the model stored in the first edge server 312 may be generated based on a noise signal obtained by the first base station 311 or a microphone physically connected with the first base station 311.

According to certain embodiments, the electronic device 101 may obtain the noise model for the sound quality enhancement from the first edge server 311. For example, the electronic device 101 may obtain, from the first edge server 311, the noise model associated with the position of the electronic device 101.

According to certain embodiments, the data transmission/reception between the electronic device 101 and the server 204 may be performed by using the first edge server 311. For example, the electronic device 101 may transmit the audio signal to the server 204 through the first edge server 311. For example, the electronic device 101 may receive the sound quality enhancement model from the server 204 through the edge server 311.

According to certain embodiments, the electronic device 101 may update the sound quality enhancement model in real time during a voice call with the first external electronic device 202. For example, the electronic device 101 may perform the optimized sound quality enhancement by updating the sound quality enhancement model in real time. According to an embodiment, the electronic device 101 may perform sound quality improvement using the 5th generation mobile communication including edge computing.

Figure 4:
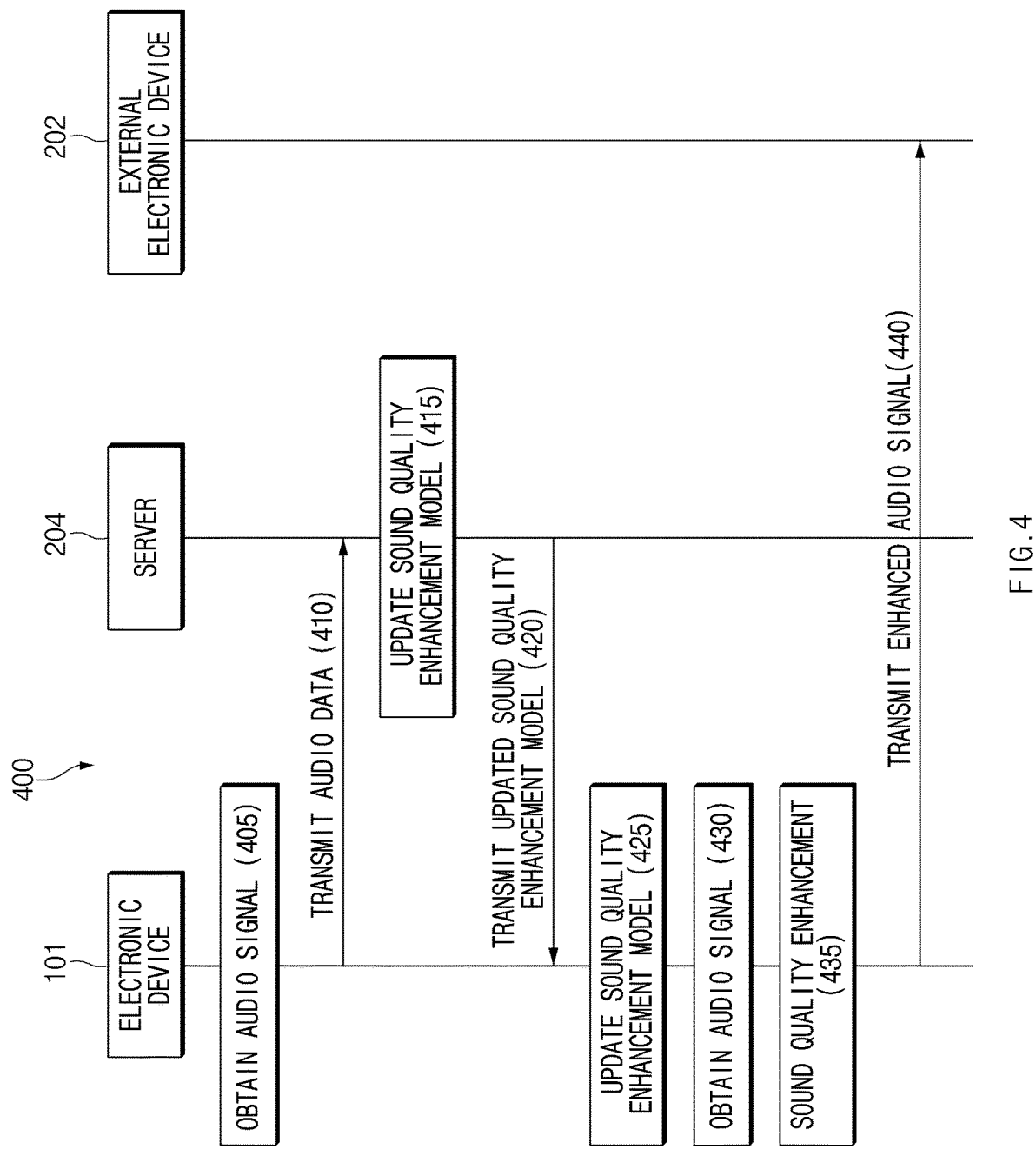
FIG. 4 illustrates a signal flowchart of a method for sound quality enhancement at a transmission stage, according to certain embodiments.

FIG. 4 is a signal flowchart 400 of a method for sound quality enhancement at a transmission stage, according to certain embodiments.

Referring to FIG. 4, the electronic device 101 may transmit an enhanced audio signal to the first external electronic device 202. For example, the electronic device 101 may be an electronic device to perform a voice call with the first external electronic device 202.

According to certain embodiments, the electronic device 101 may obtain the audio signal in operation 405. For example, the electronic device 101 may obtain an audio signal using a microphone of the electronic device 101. For another example, the electronic device 101 may obtain an audio signal from another electronic device (e.g., the second external electronic device 203 of FIG. 2) connected with the electronic device 101.

According to certain embodiments, in operation 410, the electronic device 101 may transmit the audio data to the server 204. For example, the electronic device 101 may transmit the audio data as noise data or voice data. According to an embodiment, the electronic device 101 may transmit the audio data under a specific condition. For example, the electronic device 101 may transmit audio data when a transmission request is received from the server 204, when the transmission request is received from a user, or when connected to a specific network during a call with another electronic device. For example, the electronic device 101 may transmit, to the server 204, information for identifying the electronic device 101 or the user of the electronic device 101 together with the audio data. According an embodiment, the electronic device 101 may transmit audio data to the server 204 through an edge server (e.g., the first edge server 311 of FIG. 3) proximate to the electronic device 101.

The following description will be made with reference to FIG. 5 regarding operations from operation 405 to operation 410.

Figure 5:
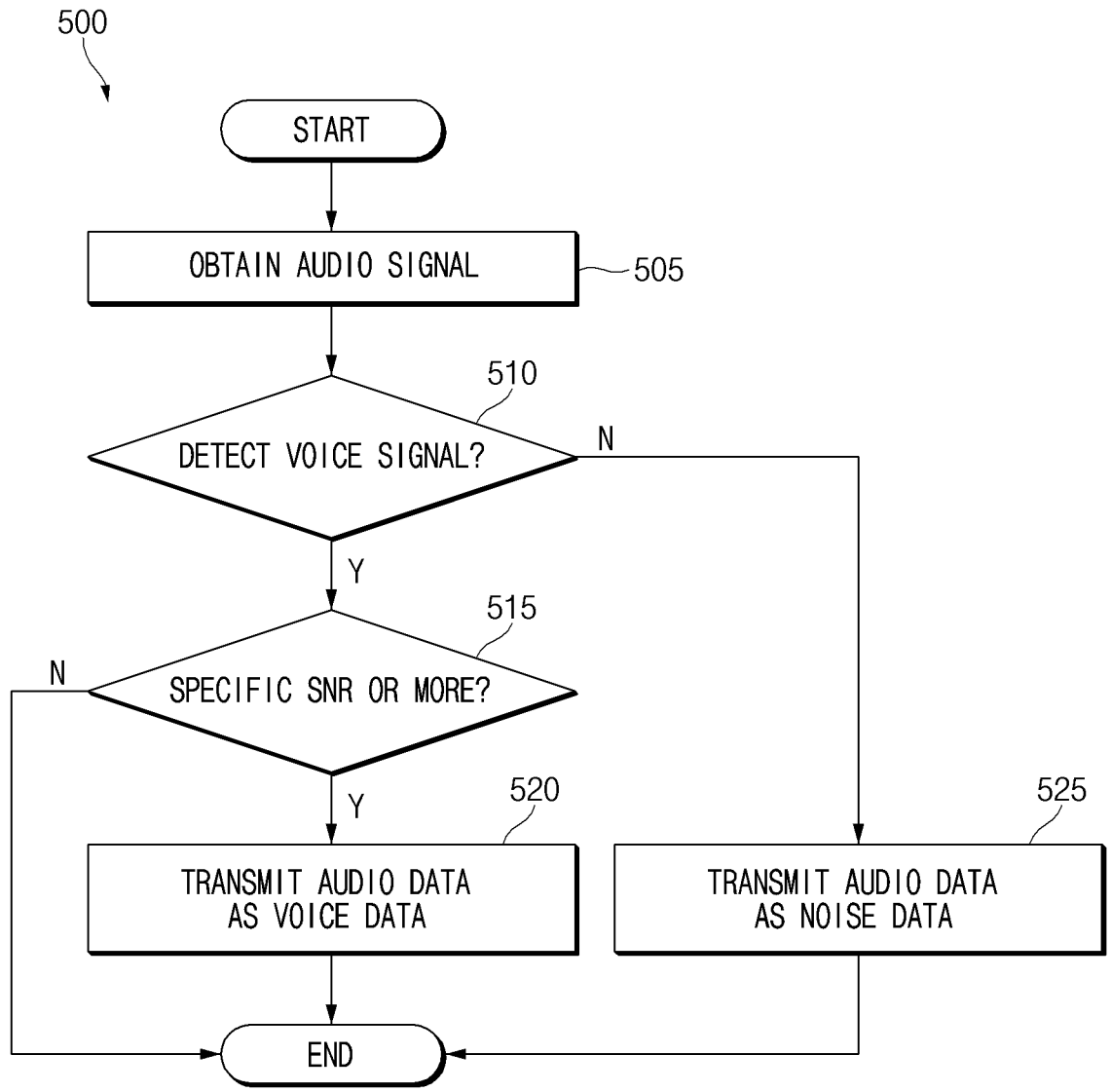
FIG. 5 illustrates a signal flowchart of a method for sound quality enhancement at a transmission stage, according to certain embodiments.

FIG. 5 is a flowchart 500 of a method for sound quality enhancement at a transmission stage, according to certain embodiments.

In operation 505, the electronic device 101 may obtain the audio signal. The operation of obtaining the audio signal may be referred to as operation 405 of FIG. 4.

According to certain embodiments, in operation 510, the electronic device 101 may determine whether the voice signal is detected from the audio signal. According to an embodiment, the electronic device 101 may determine whether the voice signal is detected from the audio signal, based on the VAD.

According to certain embodiments, in operation 525, when the voice signal is not detected, the electronic device 101 may transmit, to the server 204, the audio data, which is based on at least a portion of the obtained audio signal, as noise data. For example, the electronic device 101 may transmit information for indicating that the audio data corresponds to the noise data, together with the noise data (e.g., operation 410 of FIG. 4).

According to certain embodiments, in operation 515, when the voice signal is detected, the electronic device 101 may determine whether a proportion (e.g., speech-to-noise (SNR) ratio) of the voice signal of the obtained audio signal is equal to or greater than a specific proportion. For example, the electronic device 101 may determine the SNR using the sound quality enhancement model stored in the electronic device 101.

According to certain embodiments, in operation 520, when the SNR is equal to or greater than a specific SNR, the electronic device 101 may transmit, to the server 204, audio data based on the obtained audio signal, as the voice data. For example, the electronic device 101 may transmit information for indicating that the audio data is voice data, together with the audio data. According to an embodiment, the electronic device 101 may transmit, to the server 204, the audio data as a clean speech sample (e.g., operation 410 of FIG. 4).

Referring back to FIG. 4, according to certain embodiments, in operation 415, the server 204 may update the sound quality enhancement model using the received audio data. According to an embodiment, the server 204 may generate and/or update the sound quality enhancement model associated with the electronic device 101 or the user of the electronic device 101, by using the audio signal. For example, the server 204 may update a sound quality enhancement model corresponding to identification information by using information for identifying the electronic device 101 or the user of the electronic device 101 which are received together with the audio data. According to an embodiment, when the audio data is received as a noise model, the server 204 may generate and/or update, by using the audio data, the sound quality enhancement model associated with the electronic device 101 and/or the noise model associated with the position of the electronic device 101. For example, the server 204 may store and classify the noise model based on the position (e.g., a base station (e.g., the first base station 311 of FIG. 3) connected with the electronic device 101) of the electronic device 101.

According to certain embodiments, in operation 420, the server 204 may transmit, to the electronic device 101, the updated sound quality enhancement model. For example, the server 204 may transmit the sound quality enhancement model through the edge server (e.g., the first edge server 311 of FIG. 3) proximate to the electronic device 101. According to an embodiment, the server 204 may transmit, to the electronic device 101, information on the update of the sound quality enhancement model.

According to certain embodiments, in operation 425, the electronic device 101 may update the sound quality enhancement model stored in the memory of the electronic device 101 by using the received sound quality enhancement model.

According to certain embodiments, in operation 430, the electronic device 101 may obtain the audio signal. For example, the electronic device 101 may obtain the audio signal depending on the manners described above in relation to operation 405. For example, the electronic device 101 may obtain the audio signal as the voice call is performed with respect to the first external electronic device 202.

According to certain embodiments, in operation 435, the electronic device 101 may perform the sound quality enhancement for the obtained audio signal. According to an embodiment, the electronic device 101 may perform the sound quality enhancement for the audio signal using the stored sound quality enhancement model. For example, the electronic device 101 may perform noise suppression and/or echo removal for the audio signal.

According to certain embodiments, in operation 440, the electronic device 101 may transmit the enhanced audio signal to the first external electronic device 101.

As illustrated in FIG. 4, according to an embodiment, operation 405 to operation 425 may be performed before the voice call with the first external electronic device 202. For example, the electronic device 101 may update the sound quality enhancement model at an arbitrary time point before the voice call with the first electronic device 101. According to an embodiment, operation 405 to operation 440 may be performed in real time during the voice call with the first electronic device 202. For example, the electronic device 101 may perform the optimal sound quality enhancement by updating the sound quality enhancement model in real time during the call with the first electronic device 202.

Figure 6:
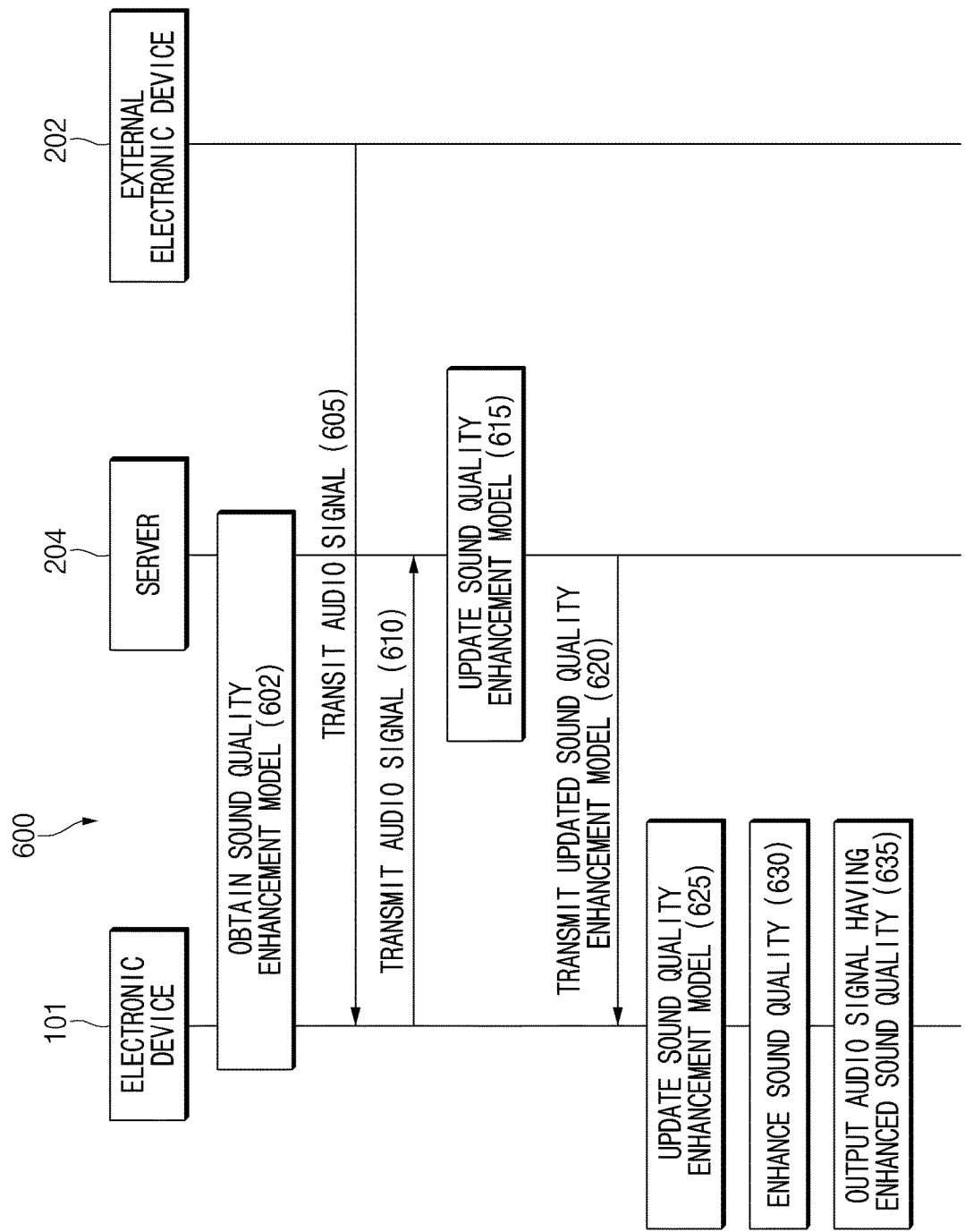
FIG. 6 illustrates a signal flowchart of a method for sound quality enhancement at a reception stage, according to certain embodiments.

FIG. 6 is a signal flowchart 600 of a method for sound quality enhancement at a transmission stage, according to certain embodiments.

According to certain embodiments, in operation 602, the electronic device 101 may obtain the sound quality enhancement model associated with the first external electronic device 202 from the server 204. According an embodiment, the electronic device 101 may obtain a sound quality enhancement model associated with the first external electronic device 202 by requesting the server 204 to transmit the sound quality enhancement model associated with the first external electronic device 202 For example, the electronic device 101 may receive the voice model of the first external electronic device 202 stored in the server 204 by transmitting ID information (e.g., a phone number) of the first external electronic device 202 to the server 204.

According to an embodiment, the electronic device 101 may perform operation 602 during the voice call with the first external electronic device 202. According to an embodiment, the electronic device 101 may perform operation 602 with respect to the first external electronic device 202 having the voice call history with the electronic device 101. According to an embodiment, operation 602 may be omitted.

According to certain embodiments, in operation 605, the first external electronic device 202 may transmit the audio signal to the electronic device 101. For example, the electronic device 101 may receive the audio signal through the voice call with the first external electronic device 202.

According to certain embodiments, in operation 610, the electronic device 101 may transmit, to the server 204, the audio signal received from the first external electronic device 202. According to an embodiment, the electronic device 101 may transmit audio data based on the received audio signal. For example, the audio data may include data generated through after-processing for at least a portion of the audio signal or the audio signal received from the first external electronic device 202. According to an embodiment, when the voice signal is not detected from the audio signal, the electronic device 101 may transmit the audio data, which serves as noise data, to the server 204. According to an embodiment, when the voice signal is detected from the audio signal and when the proportion (e.g., SNR) of the voice signal is equal to or greater than a specific proportion, the electronic device 101 may transmit the audio data, which serves as voice data, to the server 204. According to an embodiment, the electronic device 101 may transmit an identifier of the first external electronic device 202 to the server 204 together with the audio signal.

According to certain embodiments, in operation 615, the server 204 may update the sound quality enhancement model associated with the first external electronic device 202 using the received audio signal. According to an embodiment, the server 204 may generate and/or update the sound quality enhancement model associated with the electronic device 202 or the user of the electronic device 202, by using the audio signal. For example, the server 204 may update a sound quality enhancement model corresponding to identification information by using information for identifying the first external electronic device 202 which are received together with the audio signal. According to an embodiment, when the audio signal is received as noise data, the server 204 may generate and/or update a noise model using the audio signal. For example, the server 204 may store and classify the noise model based on the position (e.g., a base station (e.g., the second base station 321 of FIG. 3) connected with the first external electronic device 202) of the first external electronic device 202.

According to certain embodiments, in operation 620, the server 204 may transmit, to the electronic device 101, the updated sound quality enhancement model associated with the first external electronic device 202. For example, the server 204 may transmit the sound quality enhancement model through the edge server (e.g., the first edge server 311 of FIG. 3) proximate to the electronic device 101. According to an embodiment, the server 204 may transmit, to the electronic device 101, information on the update of the sound quality enhancement model.

According to certain embodiments, in operation 625, the electronic device 101 may update the sound quality enhancement model associated with the first external electronic device 202 stored in the memory of the electronic device 101 by using the received sound quality enhancement model. The electronic device 101 may store the received sound quality enhancement model in the memory of the electronic device 101.

According to certain embodiments, in operation 630, the electronic device 101 may perform sound quality enhancement for an audio signal received from the first external electronic device 202. According to an embodiment, the electronic device 101 may perform the sound quality enhancement for the audio signal using the stored sound quality enhancement model. For example, the electronic device 101 may perform speech enhancement, speech regression noise suppression and/or echo removal for the audio signal.

According to certain embodiments, in operation 635, the electronic device 101 may obtain the audio signal having the enhanced sound quality. For example, the electronic device 101 may output an audio signal through a speaker of the electronic device 101 or another electronic device (e.g., the second external electronic device 203 of FIG. 2) connected with the electronic device 101.

Figure 7:
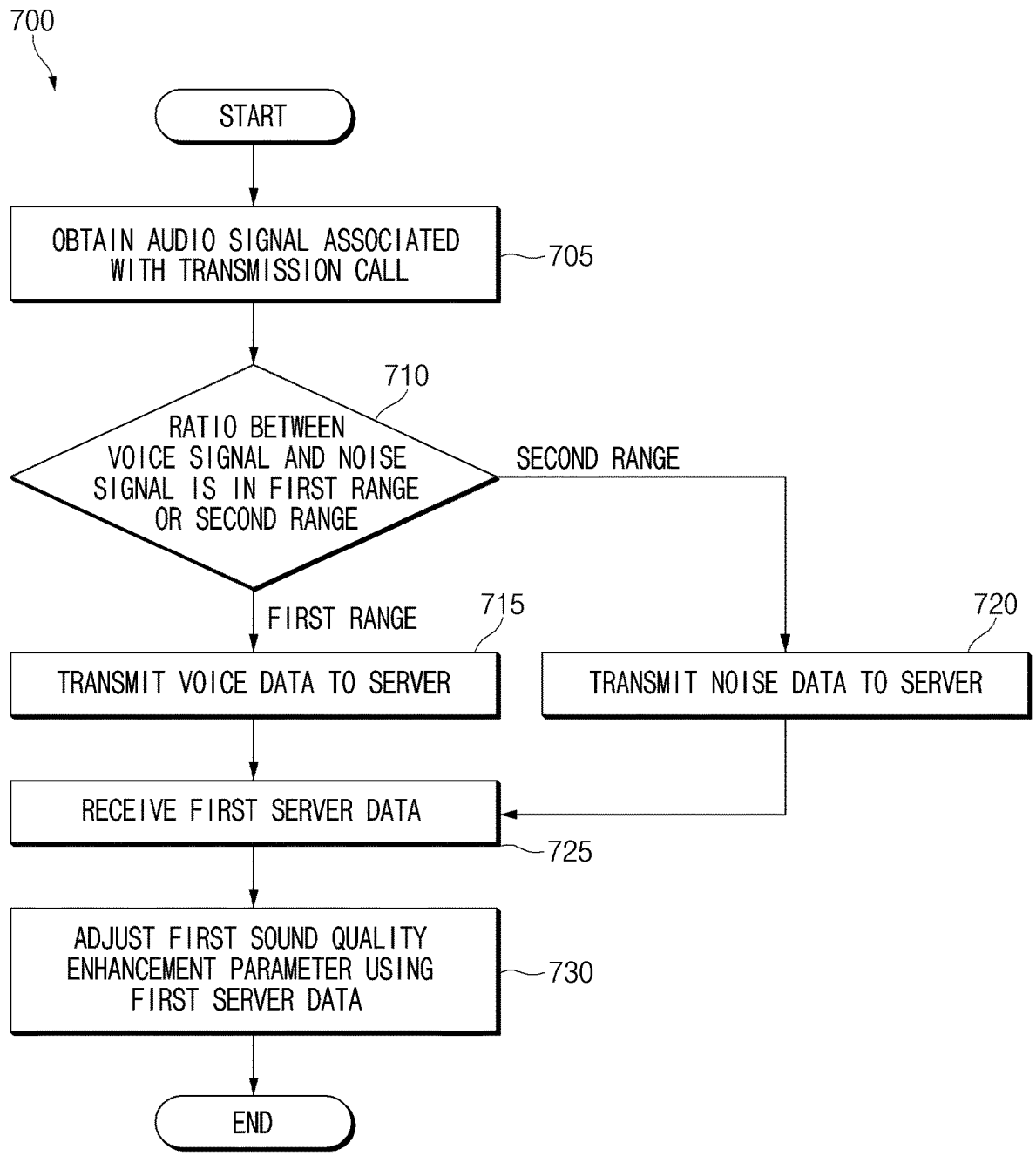
FIG. 7 illustrates a flowchart illustrating a method for sound quality enhancement at the transmission stage, according to certain embodiments.

FIG. 7 is a signal flowchart 700 of a method for sound quality enhancement at a transmission stage, according to certain embodiments.

According to certain embodiments, the electronic device 101 may include a communication circuitry (e.g., the communication module 190 of FIG. 1), a microphone (e.g., the input device 150 of FIG. 1), a memory (e.g., the first memory 130 of FIG. 1) having a first parameter associated with the voice of the speech and a second parameter (e.g., a noise model) associated with the noise of the speech. For example, the processor may be operatively connected with the communication circuitry, the microphone, and the memory.

According to certain embodiments, in operation 705, the processor may obtain an audio signal associated with the speech through the microphone using the communication circuit. For example, the processor may obtain an audio signal in which a call is established with the external electronic device (e.g., the first external electronic device 202 of FIG. 2).

According to certain embodiments, in operation 710, the processor may determine whether the ratio (e.g., SNR) of a voice signal to a noise signal included in an audio signal belongs to a specific first rage or a specific second range. For example, the processor may determine the proportion of the voice signal in the audio signal by using the sound quality enhancement model stored in the memory. For example, the lower limit value of the first range may exceed the upper limit value of a specific second range.

According to certain embodiment, when the ratio is in the first range, in operation 715, the processor may transmit, to the server, at least a portion of the voice signal included in the audio signal such that the server (e.g., the server 204 of FIG. 2) generates the first server data (e.g., the sound quality enhancement model or data for updating the sound quality enhancement model) using the voice data. According to an embodiment, the electronic device 101 may transmit, to the server, an identifier of the electronic device 101 together with the voice signal.

According to certain embodiments, when the ratio is in the second range, in operation 720, the processor may transmit, to the server, noise data such that the server generates the first server data (e.g., the sound quality enhancement model or data for updating the sound quality enhancement model) using the noise data. According to an embodiment, the electronic device 101 may transmit, to the server, an identifier of the electronic device 101 together with the voice signal.

According to an embodiment, the server may generate the first server data based on machining learning using the received voice data or noise data.

According to certain embodiments, in operation 725, the electronic device 101 may receive the first server data from the server.

According to certain embodiments, in operation 730, the electronic device 101 may adjust a first sound quality enhancement parameter (e.g., a sound quality enhancement model) using the first server data.

According to certain embodiments, the processor may obtain a noise signal from another external electronic device (e.g., the first base station 311 of FIG. 3 or the first edge server 312) associated with the call connection with the external electronic device. For example, the processor may be configured to transmit at least a portion of the obtained noise signal to the server. For example, another external electronic device associated with the connection of the call may be a base station connected with the electronic device 101. For example, the noise signal obtained from another electronic device may correspond to a noise signal in an area geographically adjacent to the base station.

According to certain embodiments, the processor may perform sound quality enhancement of an audio signal using the sound quality enhancement parameter of the memory of the electronic device 101, when the audio signal is obtained in relation to the speech through the microphone of the electronic device 101. For example, the electronic device 101 may perform the sound quality enhancement in the call connection with the external electronic device.

Figure 8:
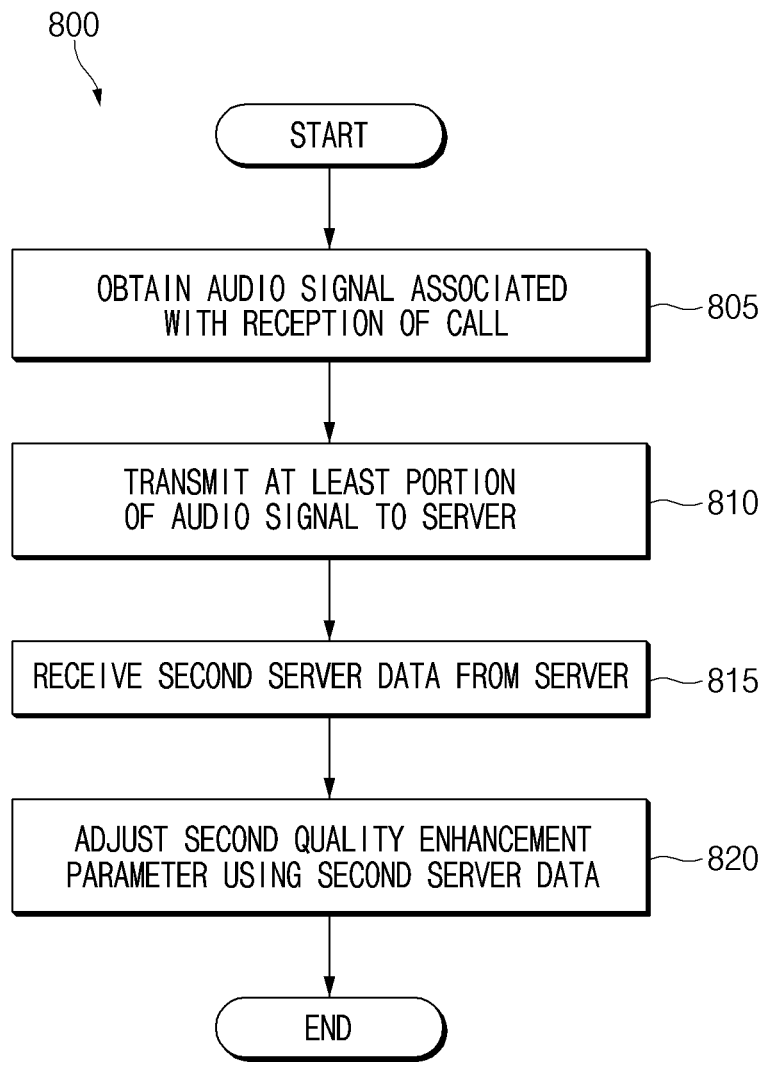
FIG. 8 illustrates a flowchart of a method for sound quality enhancement at the reception stage, according to certain embodiments.

FIG. 8 is a signal flowchart 800 of a method for sound quality enhancement at a transmission stage, according to certain embodiments.

According to certain embodiments, the electronic device 101 may include a communication circuitry (e.g., the communication module 190 of FIG. 1), a microphone (e.g., the input device 150 of FIG. 1), a memory (e.g., the first memory 130 of FIG. 2) having a first parameter associated with the voice of the speech and a second parameter (e.g., a noise model) associated with the voice of the speech. For example, the processor may be operatively connected with the communication circuitry, the microphone, and the memory.

According to certain embodiments, in operation 805, the processor of the electronic device 101 may obtain an audio signal associated with the speech from an external electronic device (e.g., the first external electronic device 202 of FIG. 2) through the communication circuit. For example, the electronic device 101 may receive an audio signal from an external electronic device during the voice call with the external electronic device.

According to certain embodiments, in operation 810, the processor may transmit, to the server (e.g., the server 204 of FIG. 2), at least a portion of the audio signal. For example, the processor may transmit, to the server, at least a portion of the audio signal, such that the server updates a second sound quality enhancement parameter (e.g., a second sound quality enhancement model) corresponding to the external electronic device.

According to certain embodiments, in operation 815, the processor may receive the second server data from the server. For example, the second server data may include a second sound quality enhancement parameter, which is updated based on at least a portion of the transmitted audio signal, of the electronic device.

According to certain embodiments, in operation 820, the processor may adjust the second sound quality enhancement parameter using the second server data.

According to certain embodiments, the processor may perform the sound quality enhancement of the audio signal obtained by using the sound quality enhancement parameter stored in the memory, when the audio signal is obtained from the external electronic device in the state that call connection is made with the external electronic device.

Figure 9:
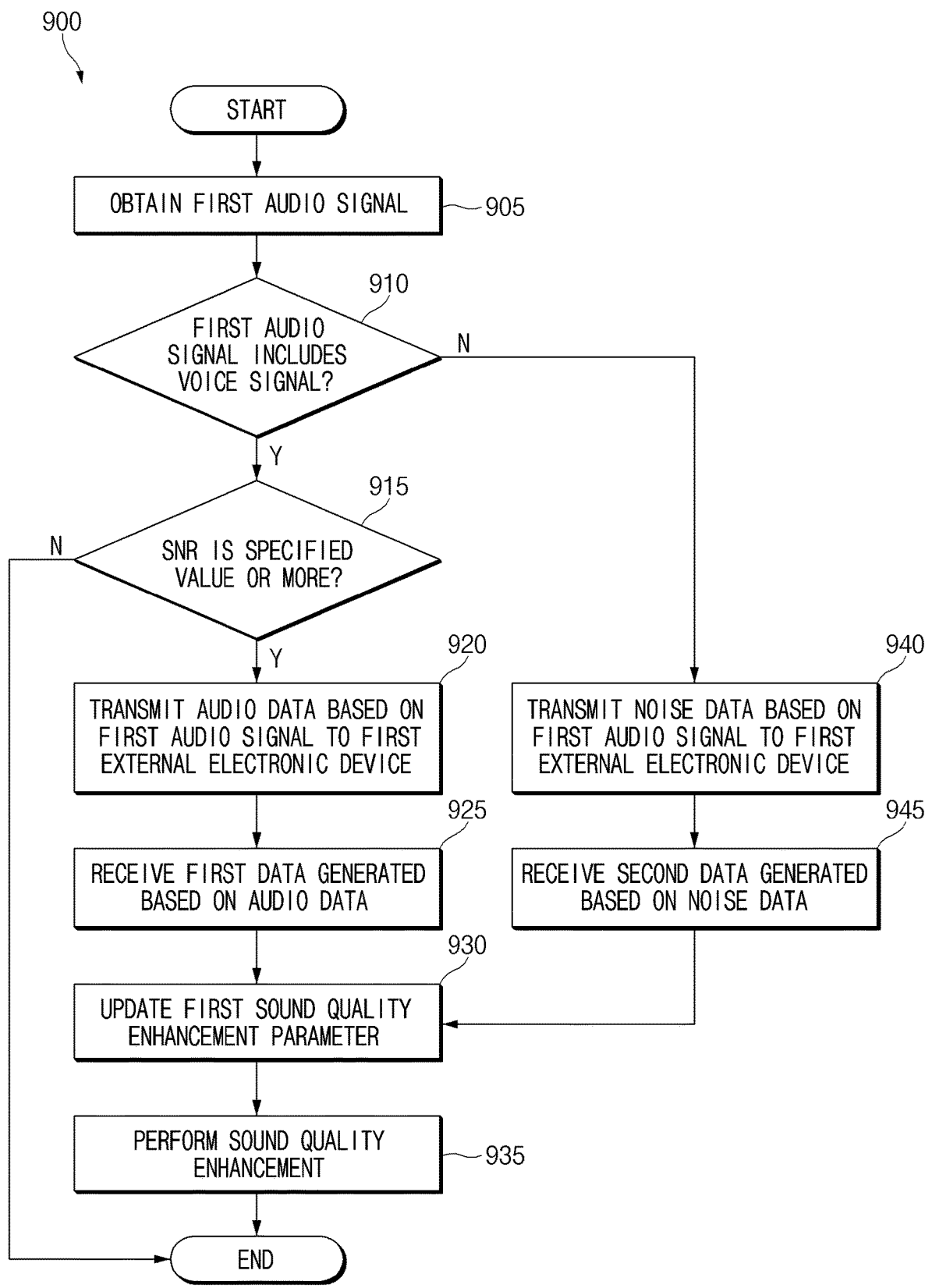
FIG. 9 illustrates a flowchart of a method for sound quality enhancement, according to certain embodiments.

FIG. 9 is a signal flowchart 900 of a method for sound quality enhancement at a transmission stage, according to certain embodiments.

According to certain embodiments, the electronic device 101 may include a communication circuitry (e.g., the communication module 190 of FIG. 1), a speaker (e.g., the sound output device 155 and/or the audio module 170 of FIG. 1), a microphone (e.g., the input device 150 of FIG. 1), a memory (e.g., the memory 130 of FIG. 1) having the first sound quality enhancement parameter associated with the electronic device 101 or the user of the electronic device 101, and a processor (e.g., the processor 120 of FIG. 1). For example, the processor may be operatively connected with the speaker, the communication circuitry, the microphone, and the memory. According to an embodiment, the processor may perform the operations of the electronic device 101 to be described. For example, the processor may perform operations to be described in response to instructions stored in the memory.

According to certain embodiments, in operation 905, the processor of the electronic device 101 may obtain the audio signal. For example, the electronic device 101 may obtain a first audio signal using a microphone of the electronic device 101.

According to certain embodiments, in operation 910, the electronic device 101 may determine whether the first audio signal includes a voice signal. For example, the electronic device 101 may determine whether the voice signal is included, based on the VAD.

According to certain embodiments, when the first audio signal includes a voice signal at 910, in operation 915, the electronic device 101 may determine whether an SNR for a voice signal of the first audio signal is equal to or greater than a specific value when the first audio signal includes a voice signal. For example, the electronic device 101 may determine the SNR using the first sound quality enhancement parameter stored in the memory.

According to certain embodiments, when the SNR is equal to or greater than the specific value, in operation 920, the electronic device 101 may transmit the audio data based on the first audio signal to the first external electronic device (e.g., the server 204 of FIG. 2).

According to certain embodiments, in operation 925, the electronic device 101 may receive the first data, which is generated based on the voice data, from the first external electronic device, in response to the transmission of the voice data. For example, the first data may include the sound quality enhancement parameter generated through the machine learning based on the voice data or the information associated with the sound quality enhancement parameter. According to an embodiment, the first external electronic device may generate the first data based at least on the specific noise signal and voice data.

According to certain embodiments, when the SNR is less than the specific value, in operation 940, the electronic device 101 may transmit the noise data based on the first audio signal to the first external electronic device (e.g., the server 204 of FIG. 2).

According to certain embodiment, in operation 945, the electronic device 101 may receive the second data generated based on the noise data from the first external electronic device in response to the transmission of the noise data. For example, the second data may include the sound quality enhancement parameter generated through the machine learning based on the noise data or the information associated with the sound quality enhancement parameter. According to an embodiment, the first external electronic device may generate second data based at least on the received noise data and/or the noise signal obtained from the second external electronic device (e.g., the first base station 311 of FIG. 3). For example, the second external electronic device may be an electronic device geographically adjacent to the electronic device 101. For example, the second external electronic device may be a base station in a cellular network connected with the electronic device 101.

According to certain embodiments, in operation 930, the electronic device 101 may update the first sound quality enhancement parameter. For example, the electronic device 101 may update the first sound quality enhancement parameter stored in the memory using the first data or the second data.

According to certain embodiments, in operation 935, the electronic device 101 may perform sound quality enhancement using the updated first sound quality enhancement parameter. For example, the electronic device 101 may perform the sound quality enhancement such as eco removal, speech regression, and/or speech enhancement, by performing machine learning for the audio signal using the first voice signal. For example, the electronic device 101 may perform the sound quality enhancement such as noise removal by performing the machine learning for the audio signal by using the first noise signal.

According to certain embodiments of the disclosure, the electronic device may consistently correct the sound quality for the transmission or reception of the electronic device using the network According to certain embodiments of the disclosure, the electronic device may provide the enhanced communication quality to the user of the electronic device by using the transmission/reception solution based on the voice of the counterparty of the communication. Besides, a variety of effects directly or indirectly understood through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuitry configured to establish a voice call with an external electronic device;
   a microphone;
   a memory configured to store a first sound quality enhancement parameter associated with sound quality enhancement of speech from the external electronic device; and
   a processor operatively connected with the communication circuitry, the microphone, and the memory, wherein the processor is configured to:
      obtain a first audio signal associated with speech from the external electronic device through the communication circuitry, during the voice call;
      transmit, to a server, at least a portion of the first audio signal to allow the server to update the first sound quality enhancement parameter using the first audio signal;
      receive an updated sound quality enhancement parameter from the server through the communication circuit during the voice call; and
      adjust the first sound quality enhancement parameter stored in the memory, based at least on the updated sound quality enhancement parameter received from the server during the voice call;
   wherein the processor is further configured to:
      obtain a second audio signal through the microphone, during the voice call;
      identify a ratio of a voice signal to a noise signal included in the second audio signal belonging to a first range;
      transmit, to the server, voice data of the second audio signal to allow the server to update a second sound quality enhancement parameter of the electronic device using the voice data, when the ratio is within the first range;
      transmit, to the server, noise data of the second audio signal to allow the server to update the second sound quality enhancement parameter of the electronic device using the noise data, when the ratio is less than the first range;
      receive an updated second sound quality enhancement parameter from the server through the communication circuit during the voice call; and
      adjust the second sound quality enhancement parameter based at least on the updated second sound quality enhancement parameter received from the server during the voice call.

2. The electronic device of claim 1, wherein the processor is further configured to perform sound quality enhancement for audio data received from the external electronic device using the adjusted first sound quality enhancement parameter.

3. The electronic device of claim 1, wherein the processor is further configured to:
   obtain another noise data from a base station wirelessly connected with the electronic device; and
   transmit, to the server, the another noise data to allow the server to update the second sound quality enhancement parameter of the electronic device using the another noise data; and
   wherein the another noise data corresponds to a noise signal associated with an area proximate to the base station.

4. The electronic device of claim 1, wherein the processor is further configured to:
   perform sound quality enhancement for audio signals received though the microphone using the adjusted second sound quality enhancement parameter.

5. The electronic device of claim 1, wherein the processor is further configured to transmit an identification of the electronic device along with the voice data of the second audio signal the noise data of the second audio signal.

6. The electronic device of claim 1, wherein the first sound quality enhancement parameter is mapped with the external electronic device or a user of the external electronic device.

7. An electronic device comprising:
a communication circuit;
a speaker;
a microphone;
a memory storing a first sound quality enhancement parameter associated with the electronic device or a user of the electronic device; and
a processor operatively connected with the communication circuit, the speaker, the microphone, and the memory,
wherein the processor is configured to:
perform a call with a first external device using the communication circuit,
receive a first audio data from the first external device during the call,
transmit, to a second external device, the first audio data to update a first sound quality enhancement parameter, when the first audio data includes a voice signal and a signal-to-noise ratio (SNR) of the voice signal is equal to or greater than a specific value,
receive, from the second external device, an updated first sound quality enhancement parameter, and
perform sound quality enhancement for audio data received from the first external device using the updated first sound quality enhancement parameter,
wherein the processor is further configured to:
obtain a second audio signal using the microphone,
determine whether the second audio signal includes a voice,
determine whether a SNR of the second audio signal is equal to or greater than the specific value,
transmit, to the second external device, voice data of the second audio signal, when the SNR of the second audio signal is equal to or greater than the specific value,
receive first data generated based on the voice data from the second external device, in response to transmission of the voice data,
update a second sound quality enhancement parameter using the first data, and
perform sound quality enhancement of audio signals obtained through the microphone using the updated second sound quality enhancement parameter.

8. The electronic device of claim 7, wherein the processor is further configured to:
transmit, to the second external device, noise data of the second audio signal, when the second audio signal does not include the voice,
receive second data generated based on the noise data from the second external device, in response to transmission of the noise data, and
update the second sound quality enhancement parameter using the second data.

9. The electronic device of claim 8, wherein the second data includes a sound quality enhancement parameter associated with the electronic device and updated by the second external device based the noise data.

10. The electronic device of claim 8, wherein the second data includes a sound quality enhancement parameter associated with the electronic device and updated by the second external device based on a noise signal obtained by a base station connected with the electronic device and the noise data.

11. A method for sound quality enhancement of an electronic device, the method comprising:
performing a call with a first external device using a communication circuit of the electronic device;
receiving a first audio data from the first external device during the call;
transmitting, to a second external device, the first audio data to update a first sound quality enhancement parameter, when the first audio data includes a voice signal and a signal-to-noise ratio (SNR) of the voice signal is equal to or greater than a specific value;
receiving, from the second external device, an updated first sound quality enhancement parameter;
performing sound quality enhancement for audio data received from the first external device using the updated first sound quality enhancement parameter;
obtaining a second audio signal using a microphone of the electronic device;
determining whether the second audio signal includes a voice;
determining whether a SNR of the second audio signal is equal to or greater than the specific value,
transmitting, to the second external device, voice data of the second audio signal, when the SNR of the second audio signal is equal to or greater than the specific value;
receiving first data generated based on the voice data from the second external device, in response to transmission of the voice data;
updating a second sound quality enhancement parameter using the first data; and
performing sound quality enhancement of audio signals obtained through the microphone using the updated second sound quality enhancement parameter.

12. The method of claim 11, further comprising:
transmitting, to the second external device, noise data of the second audio signal, when the second audio signal does not include the voice;
receiving second data generated based on the noise data from the second external device, in response to transmission of the noise data; and
updating the second sound quality enhancement parameter of the electronic device using the second data.

13. The method of claim 12, wherein the second data includes a sound quality enhancement parameter associated with the electronic device and updated by the second external device based on the noise data.

14. The method of claim 12, wherein the second data includes a sound quality enhancement parameter associated with the electronic device and updated by the second external device based on a noise signal obtained by a base station connected with the electronic device and the noise data.

* * * * *